May 15, 1962   G. BERTRAND   3,035,217
CONTROL DEVICE FOR UNIVERSAL MOTORS, CHIEFLY FOR
MOTORS DRIVING SEWING MACHINES
Filed Sept. 28, 1959   4 Sheets-Sheet 1
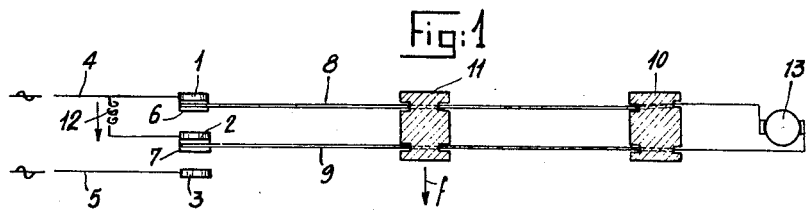
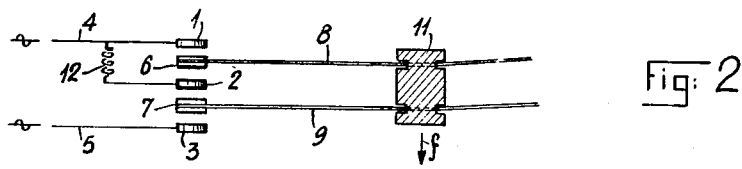
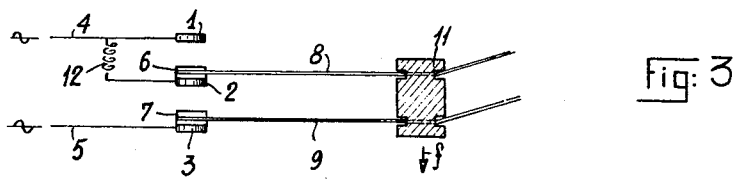
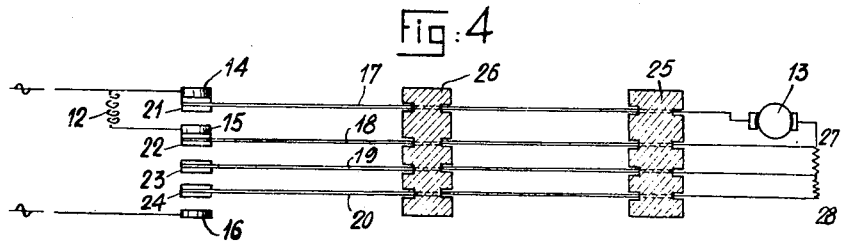
INVENTOR
GEORGES BERTRAND
By Irwin S. Thompson
ATTY.

FIG. 7 FIG. 9 FIG. 11 FIG. 13
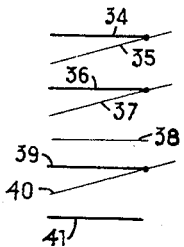 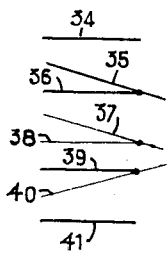 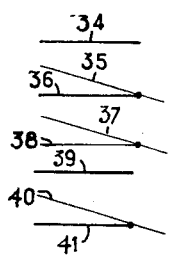 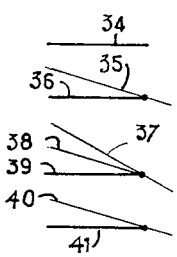
FIG. 6 FIG. 8 FIG. 10 FIG. 12
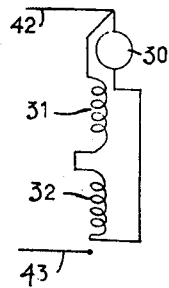 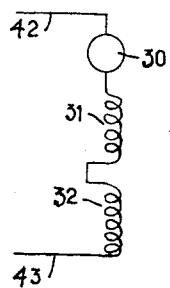 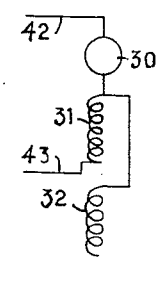 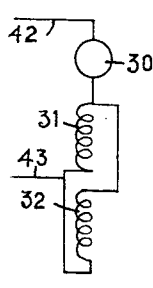
FIG. 5
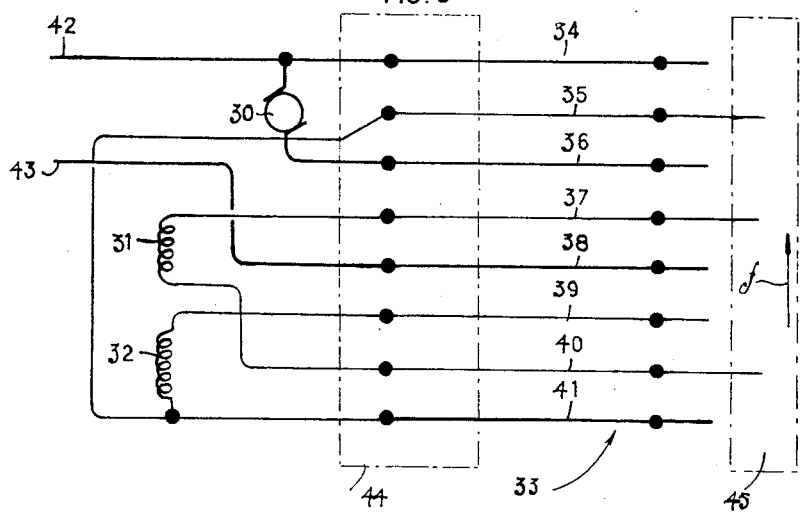
INVENTOR
GEORGES BERTRAND
ATTY.

May 15, 1962

G. BERTRAND 3,035,217

CONTROL DEVICE FOR UNIVERSAL MOTORS, CHIEFLY FOR
MOTORS DRIVING SEWING MACHINES

Filed Sept. 28, 1959

INVENTOR

GEORGES BERTRAND

By Irwin S. Thompson
ATTY.

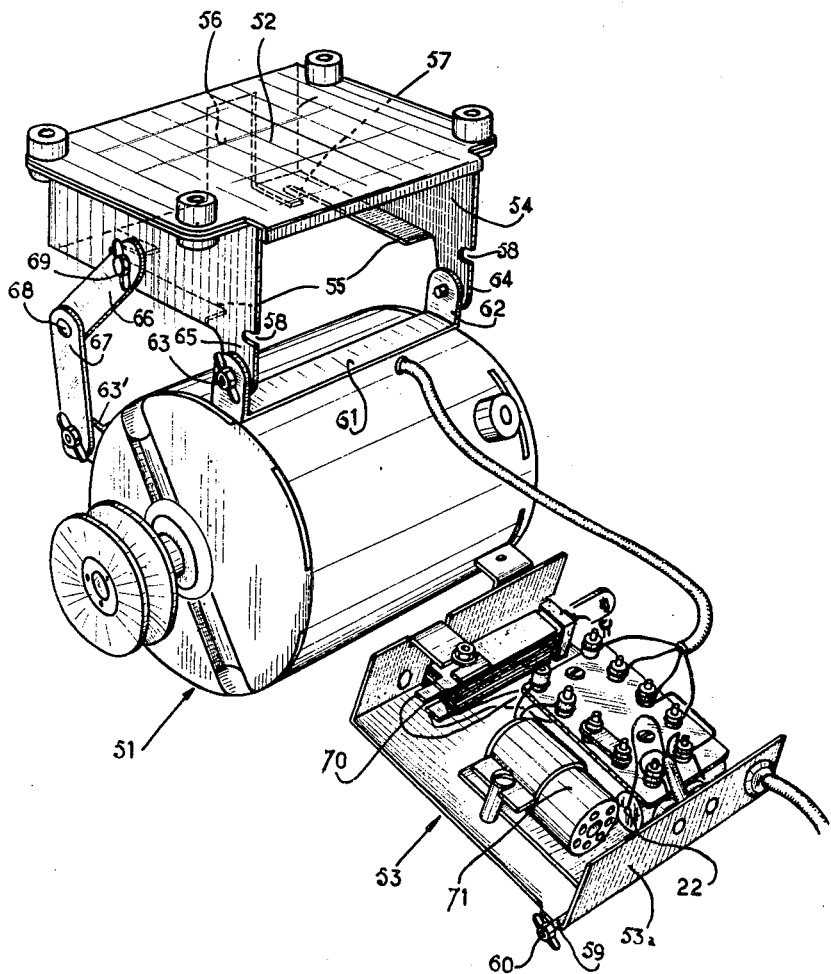

United States Patent Office 3,035,217
Patented May 15, 1962

3,035,217
CONTROL DEVICE FOR UNIVERSAL MOTORS, CHIEFLY FOR MOTORS DRIVING SEWING MACHINES
Georges Bertrand, Paris, France
(69 Ave. de Gravelle, Charenton, Seine, France)
Filed Sept. 28, 1959, Ser. No. 842,910
Claims priority, application France Oct. 2, 1958
2 Claims. (Cl. 318—246)

My invention has for its object a control system for a universal motor of the series wound type, chiefly intended for the driving of sewing machines.

Electric motors for sewing machines are generally controlled by a pedal acting against a return spring through the agency of a chain or a lever ensuring the starting and adjustment of speed through the agency of a rheostat. As soon as the thrust exerted on the pedal is released, the lever is returned by the cooperating spring into a position for which it acts on a mechanical brake of the shoe, ribbon or the like type, which brake engages frictionally a drum secured to the end of the driving shaft.

This control system shows various drawbacks. As a matter of fact, the efficiency of the braking depends directly on the power of the lever-returning spring and the seamstress has to overcome said power at each starting of the motor and throughout the period of energization of the motor. This results in a considerable straining for the seamstress.

On the other hand, the lever, when in its inoperative or braking position, locks the machine in the position in which it happens to have stopped. If it is desired to modify by hand the position of the inoperative machine, it is necessary to release the brake by exerting a comparatively reduced thrust on the lever-controlling pedal, so as to make the motor start.

From the standpoint of the actual control of the motor, the conventional means for adjusting the speed of the latter through an adjusting rheostat are of a very rudimentary structure and do not allow providing a fine adjustment of the speed especially for low speed conditions.

Now, my invention has for its object a control system for an electric motor intended for sewing machines, which system is of an easy and sensitive operation and requires the exertion of no substantial physical stress by the seamstress.

According to a general feature of my invention, the control system includes a multiple switch or controller adapted to occupy selectively an inoperative position for which a self-braking torque is applied to the machine through a connection of the field windings with the terminals of the armature winding and at least one operative position for which the motor is energized, said controller being operable starting from said inoperative position against the action of elastic returning means.

The braking torque is particularly large since the field windings inserted in series and the resistance of which is small are connected across the terminals of the armature winding; the elastic returning force which it is necessary to overcome so as to provide the control operation acts only on the controller and may be very small. Furthermore, it is possible, while keeping the controller in its inoperative position, to shift the machine by hand without overcoming any other force than that of the friction of the movable parts.

The electric self-braking of the motor provides for the applications considered a number of further advantages with reference to the mechanical brakings conventionally used hitherto, to wit: a large efficiency, an easy rotation of the motor when inoperative, a smoother control and a free end of the shaft no longer engaged by mechanical braking means, so that the driving pulley may be fitted on either end of the shaft upon mere turning round of the motor end for end. This latter possibility allows obtaining with a motor having a predetermined direction of rotation a drive of the machine in either direction.

In a first embodiment of my invention, operation of the motor is obtained by shifting the latter out of its inoperative position, so as to gradually cut out the resistances introduced for the first operative position in the circuit feeding the armature.

In another embodiment, operation is obtained through different couplings of the two field windings ensuring a number of gradually increasing speeds upon operation of the commutator against a force returning the commutator towards an inoperative position for which a self-braking is obtained.

The features and advantages of my invention will appear readily from the reading of the following description of the embodiments illustrated by way of examples in the accompanying drawings, wherein:

FIGS. 1 to 3 are three wiring diagrams of the control system of a motor driving a sewing machine, respectively for its braking position, its freely revoluble position obtained after cutting off of the energization and its normal running position.

FIG. 4 is a modified embodiment of a control system incorporating a rheostat for adjusting the speed of the motor.

FIG. 5 is a diagrammatic view of another modification of the motor-controlling system.

FIGS. 6 and 7 are diagrammatic views respectively of the circuit feeding the motor and of the collector for the self-braking position of the control system illustrated in FIG. 5.

Figure 14:
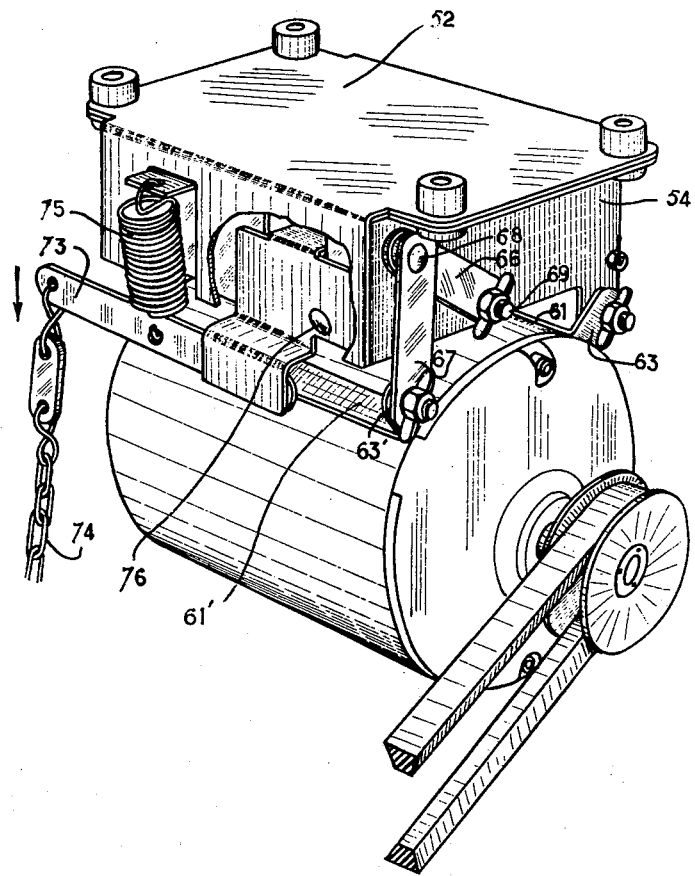

FIGS. 8 and 9, 10 and 11, 12 and 13 are views similar to FIGS. 6 and 7, respectively, for further positions of adjustment of the motor speed.

FIG. 14 is a perspective view of the motor equipped with its control system.

FIG. 15 is a perspective view of the motor with the drawer carrying the control system in its released position.

The feeding system illustrated diagrammatically in FIGS. 1 to 3 includes three stationary contact-pieces 1, 2 and 3 located in vertical registry and with equal spacings between them.

The contact-pieces 1 and 3 are connected through corresponding leads 4 and 5 to a suitable A.C. or D.C. voltage supply.

Between the contact-pieces 1 and 2, on the one hand, and 2 and 3, on the other hand, are inserted movable contact-pieces 6 and 7 carried by the ends of the elastic blades 8 and 9. Said blades 8 and 9 are secured through their opposite ends to an insulating block 10, while an intermediate freely shiftable block 11 forming an operative knob is fitted over the blades 8 and 9. The latter are parallel with each other and their spacing is equal to the distance separating the contact-pieces 1, 2 and 3 from one another.

The elasticity of the blades 8 and 9 is such that they remain in a position for which the contact-pieces 6 and 7 are in contact with the contact-pieces 1 and 2 respectively, as illustrated in FIG. 1. If desired, it is possible to use an auxiliary blade-returning spring.

The field windings 12 of the series wound motor are inserted between the central stationary contact-piece 2 and the feed wire 4, while the armature winding 13 of the motor is connected across the terminals formed by the blades 8 and 9, i.e. between the contact-pieces 6 and 7.

The armature and field windings 12 and 13 may, in fact, be substituted for each other.

The operation of the arrangement is as follows:

To start the motor, the knob or block 11 is depressed in the direction of the arrow f from the position illustrated in FIG. 1. This provides the position of free rotation, the feed circuit being cut off as illustrated in FIG. 2, since the contact-pieces 6 and 7 are spaced away from the contact-pieces 1, 2 and 3.

Upon shifting further the knob 11 in the same direction, the contact-pieces 6 and 7 are brought simultaneously into contact with the contact-pieces 2 and 3 respectively, as illustrated in FIG. 3. The field and armature windings 12 and 13 are now fed normally in series by the voltage of the mains across the terminals of the wires 4 and 5.

If it is desired to stop the motor suddenly, the knob 11 should be entirely released, so that the blades 8 and 9 may return into the position illustrated in FIG. 1 for which the contact-pieces 6 and 7 engage the corresponding contact-pieces 1 and 2. The armature winding 13 closes directly over the field winding 12 and the machine operates then as a self-starting generator, which is actually possible, since the current flowing through the field winding 2 has a tendency to start and flow in the same direction as the normal energizing current, whereby the self-energization is performed under the impulse of the remanent field in the magnetic field circuit. This leads to a particularly energetic braking by reason of the low resistance of the field winding 12.

The magnetic field circuit for such electric motors is generally constituted by a stack of silicon-containing magnetic sheets which have the property of showing a very low remanence.

In order to allow using such sheets which are commonly produced nowadays, it is sufficient either to insert inside the stack a few sheets made of soft iron having a high remanence, or else to resort to a ferrule of soft iron fitted outwardly over the stator sheets in intimate contacting relationship with the latter.

In the modified embodiment illustrated in FIG. 4, the control circuit includes, as precedingly, three stationary contact-pieces 14, 15 and 16 with a number of yielding blades, say four blades for instance, 17, 18, 19 and 20, carrying terminal contact-pieces 21 to 24 inserted all in a common stationary securing block 25 and adapted to be shifted transversely by a control block or knob 26 fitted on said blade; as in the preceding case, the contact-pieces 14 to 16 and 21 to 24 are aligned transversely with one another.

However, the spacing between the contact-pieces 15 and 16 between which the three contact-pieces 22 to 24 are inserted is substantially larger than the spacing between the contact-pieces 14 and 15 between which only the contact-piece 21 is carried.

Resistances 27 and 28 inserted between the blades 18, 19 and 19, 20 respectively in series with a terminal of the armature winding 13 are adjustable, so as to suit the type of machine to be controlled.

The operation of the arrangement last described is as follows:

If no action is exerted on the knob 26, the blades 17 to 20 are urged through their own elasticity or by an auxiliary returning spring into positions such that the contact-piece 21 engages the contact-piece 14, while the contact-piece 22 engages the contact-piece 15, the contact-pieces 23 and 24 being free and spaced with reference to each other.

This position corresponds to self-braking coupling conditions. The armature winding 13 is switched off the feed circuit and is connected across the terminals of the field winding 12. This corresponds also, as in the preceding case, to the normal position of stoppage of the motor during the inoperative periods of the machine.

Now, if the knob 26 is depressed, the blades 17 to 20 are first brought into a position for which the contact-pieces 21 and 22 are separated from the contact-pieces 14 and 15.

This position for which the armature winding 13 of the motor is entirely switched off its energizing circuit and off the field winding 12 is an intermediate position. It allows simply entering the following starting position for which the contact-pieces 15, 21, on the one hand, and 16, 24, on the other hand, are in contacting relationship. The armature is then fed through the resistances 27 and 28 inserted in series. The motor revolves thus at a reduced speed. An increase in the pressure exerted on the knob 26 provides for the contact-piece 23 to engage first the contact-piece 24, whereby the resistance 28 is short-circuited and the speed of the motor increases, the contact-pieces 15, 21 remaining engaged. The speed is still further increased by a further depression of the knob 28 which produces an engagement between the three contact-pieces 22, 23 and 24, so that both resistances 27 and 28 are short-circuited, whereby the armature winding is fed under the voltage of the mains and the rotor reaches its maximum speed.

I obtain thus an arrangement wherethrough the speed of the motor is adapted to assume three different values. Of course, with the incorporation of further blades connected electrically at intermediate points of the resistance 27—28, it is an easy matter to increase the number of rotary speeds to which the motor may be adjusted.

In the arrangement illustrated in FIGS. 5 to 13, 30 designates the armature of a motor of a sewing machine; 31 and 32 designate two field windings and 33, a switch or controller illustrated diagrammatically and including eight blades, numbered 34 to 41, which are interconnected in a suitable manner, as illustrated diagrammatically in FIG. 5, to the armature winding 30, to the field windings 31 and 32 and to a supply of a one-phase voltage.

All the blades 34 to 41 are fitted at their ends facing their connections with the mains inside an insulating block 44, while the other ends of the blades 34, 36, 38, 39 and 40 are free and the blades 35, 37 and 41 include extensions fitted in a common control grid 45 subjected to the action of an elastic returning force illustrated by the arrow f.

For the inoperative position of the controller (see FIGS. 6 and 7), the contact-piece carrying the blades 35, 37 and 40 are urged upwardly under the action of the elastic returning force f, so as to engage respectively the blades 34, 36 and 39, while the blade 38 remains unconnected. It will be readily ascertained that the field windings 31 and 32 are then connected in series across the terminals of the armature, while the lead 43 fed by the supply of voltage is switched off since the blade 38 is disconnected, so that the circuit obtained is a normal inoperative self-braking circuit.

Upon action of the pusher knob or grid 44 in the direction opposed to the arrow f, it is possible to obtain first the coupling illustrated in FIGS. 8 and 9 for which the blade 35 has disengaged the blade 34 and has engaged the blade 36, while the blade 37 has disengaged the blade 36 and engaged the blade 38. The two field windings 31 and 32 are in series with the armature winding 30 across the terminals of the supply of voltage 42—43. The motor revolves at its lowest speed.

A further shifting of the control knob or grid 45 in a direction opposing the arrow f provides for the coupling illustrated in FIGS. 10 and 11. The blade 40 has then disengaged the blade 39 and engaged the blade 41, so as to disconnect the field winding 32, whereby the speed of the motor is increased.

At the end of the stroke of the control grid 45 in the direction considered, the blade 37 which is already in contact with the blade 38 engages also the blade 39, so that the two field windings 31 and 32 are inserted in parallel with each other and in series with the armature 30, whereby the adjusted speed of the motor reaches its maximum (FIGS. 12 and 13).

Upon release of the pressure exerted on the control grid 45, the self-braking position of FIGS. 6 and 7 is obtained automatically. It is thus apparent that normal operation may be provided at three speeds, the ratios between which are defined by a suitable selection of the characteristic properties of the field windings 31 and 32.

It should be mentioned that, even at high speeds, the self-braking connections which are restored immediately upon release of the pressure on the control grid 45 ensure a sudden stoppage of the motor, since the field windings are connected directly then across the terminals of the armature. This manner of operating a sewing machine is of particular advantage and allows a better adaptability than through the insertion of adjusting resistances. As a matter of fact, in the case of a rheostatic adjustment of speed, the starting and low speed torques are small because the drop in voltage in the resistance which may be inserted is particularly high and, consequently, the voltage across the terminals of the motor increases gradually with the speeding up of said motor, so that the operator is then constrained to reinsert in the circuit a higher resistance in order to obtain the desired speed, which makes the operation more difficult. Furthermore, my improved arrangement cuts out all Joule losses which, in addition to their disadvantages from an economical standpoint, lead generally to an objectionable heating, either of the motor when the adjusting rheostat is near the latter or of the seamstress when said rheostat is incorporated with the control pedal.

I will now describe, with reference to FIGS. 14 and 15, means for securing, in accordance with my invention, an electric motor and its control means on a sewing machine. Although the securing means may be used for other purposes, I wish to mention that these securing means are particularly suitable in combination with the control systems described hereinabove. As a matter of fact, the mechanical braking being replaced by an electrical braking in said control means, this allows one end of the rotor shaft carrying the brake drum in the known machines to remain free, the other end being normally engaged by the transmission pulley. This allows positioning the pulley indifferently on either end of the driving shaft and, consequently, it is possible, through a mere turning round of the motor end for end to drive the sewing machine in either direction without any change of the motor being necessary.

In the embodiment illustrated, the motor 51 of the sewing machine is suspended to a rectangular plate 52 at a predetermined distance under the latter, so as to provide a housing for the drawer 53 carrying the control system for the motor 51. To this end, and along three sides of the rectangular plate 53, there is welded a support 54 extending vertically downwardly starting from the plate 52. The side walls of said support are provided at their lower ends with horizontal flanges 55 directed inwardly and over which the drawer 53 is adapted to slide, while an opening 56 is provided in the rear wall of the support 54.

As clearly shown in FIG. 15, the breadth of the slideways formed by the flanges 55 is larger at their rear ends near the rear wall of the support 54 and notches 57 are formed longitudinally of the sidewalls in said broader sections.

Similarly, the front edge of each side wall of the support 54 is provided with a notch 58. Said pairs of notches 57 and 58 serve for holding fast the drawer 53 in its collapsed position inside the support 54. To this end, the drawer 53 is provided with two screws which are not shown in the drawings and which are screwed inside tappings provided in the lower surface of said drawer 53; the heads of the screws bear against the lower surface of the edges of said notches engaged by the screws fitted in said tappings. Furthermore, there is welded in parallelism with the front wall 53a of the drawer 53 a rod 59 with threaded ends adapted to engage the notches 58, winged nuts 60 ensuring the locking of said rod 59 in position on the support. It will be remarked that the introduction and removal of the drawer are performed simply through a thrust or a pull exerted as required on the winged nut 60.

The means for suspending the motor include two welded straps 61 and 61' arranged along two generating lines of the cylindrical casing of the motor with a spacing between them by about 90°, said straps (FIG. 14) terminating each with two perforated lugs 62, 63 and 62', 63', the lug 62' not being illustrated. The suspension means include further to the front of the side walls of the support 54 perforated lugs, respectively 64 and 65, constituted by vertical downwardly projecting extensions of said side walls. The lugs 64, 65 on the support 54 and the lugs 62, 63 on the strap 61 register with each other respectively and are rigidly secured together, in the case of the lugs 62 and 63 by a mere pin and, in the case of the lugs 64 and 65 by bolts and winged nuts. The motor is held fast in a suitable position providing for the desired tensioning of the bolts by two arms 66 and 67 forming a toggle link, pivotally secured together at 68 and the ends of which are locked through a bolt and a winged nut respectively to the lug 63' on the strap 61' and to a bolt 69 threaded into a further winged nut and extending through the side wall of the support 54.

The belt tensioning is adjusted through a pivotal movement of the motor after release of the winged locking nuts. When the motor has reached the desired position, it is sufficient to screw down and lock the winged nuts.

When it is desired to reverse the direction of drive of the belt, it is an easy matter to turn the motor round end for end, so as to bring the lug 63' into engagement with the lug 64 on the support 54, and the lug 62' into engagement with the lug 65 and, lastly, the lug 62 against the end of the lever 67.

It should be remarked that the drawer 53 carries the multiple switch controller 70 providing for the starting of the motor and its electrical self-braking, the resistances 71 for speed adjustment and the condenser 72, said resistances 71 being preferably adjustable for instance through the agency of sliding collars.

The controller 70 of the type described includes elastic blades and it is controlled by a pedal through the agency of the lever 73 pivotally secured at 76 and the chain 74 against the action of a returning spring 75.

The arrangement described hereinabove is advantageously applicable to all machines serving for industrial and manual trade purposes, wherein the motor is normally secured underneath the table of the sewing machine, as illustrated in FIGS. 14 and 15.

But it is also applicable to sewing machines, chiefly portable machines, used for domestic purposes. In such domestic machines, the motor is generally secured to the rear portion of the machine, laterally thereof, or else, it is directly incorporated with the frame of the machine.

The operation of the controller through a chain may then be replaced by a control including a toggle link or, better still, a yielding cable.

The possibility of separating mechanically the motor from its control system which is of a small bulk and is connected solely through yielding connections with the motor allows housing said control system in a part of the machine which is particularly favorable for the execution of the electrical connections. It is thus possible to provide domestic sewing machines with the same advantageous braking means as the commercial machines, which is not the case for the usual rheostat control means.

On the other hand, a substantial economy in the cost price results from the replacement of an expensive rheostat by very simple mechanical control means including a toggle link or a yielding cable.

My invention is by no means limited to the embodiments described by way of example and illustrated in the drawings and it covers all the modifications falling within the scope of the accompanying claims, such as those including a rotary controller or a controller provided with means rubbing over the contact-pieces, provided the same couplings as those described hereinabove are obtained.

What I claim is:

1. In combination with a series wound electric motor intended chiefly for the operation of sewing machines and including an armature winding and two field windings, the provision of a supply of one-phase current, a multiple-switch controller including eight superposed spaced elastic blades, an insulating block carrying said blades, means connecting the first blade to one of the armature terminals and to one terminal of the supply, the second blade to a first terminal of the first field winding, the third blade to the second terminal of the armature winding, the fourth blade to a first terminal of the second field winding, the fifth blade to the second terminal of the supply, the sixth blade to the second terminal of the first field winding, the seventh blade to the second terminal of the second field winding, and the eighth blade to the first terminal of the first field winding, and means for shifting the second, fourth and seventh blades in the direction facing the eighth blade to engage them selectively and in succession with the adjacent blades and to ensure thereby first the closing of the field winding over the armature winding thereby to form a self-braking circuit and then the closing of successive connections with the supply for energization of the motor at increasing speeds.

2. In combination with a series wound electric motor intended chiefly for the operation of sewing machines and including an armature winding and a field winding, the provision of a supply of current, a multiple-switch controller including five contact-pieces, the extreme contact-pieces being stationary, elastic blades carrying the even-numbered contact-pieces, an insulating block in which the blades are fitted through one end and an insulated control member carrying the opposite ends of the shiftable blades, means for shifting said control member and thereby said blades bodily to make the contact-pieces thereon engage selectively either of the adjacent contact-pieces, means connecting one of the extreme contact-pieces with one terminal of the supply and one terminal of one winding, means connecting the second extreme contact-piece with the other terminal of the supply, means connecting the central contact-piece with the other terminal of the last-mentioned winding and the even-numbered contact-pieces with the corresponding terminals of the other winding, whereby the shifting of said blades carrying the even-numbered contact-pieces provides selectively and in succession a closing of the two windings over each other through engagement of the first extreme contact-piece and of the central contact-piece with the corresponding even-numbered contact-pieces following them to form a self-breaking circuit, then a spacing of the even-numbered contact-pieces away from the adjacent contact-pieces to allow free rotation of the armature and then after a closing of the central contact-piece and of the second extreme contact-piece over the even-numbered contact-pieces following them to form a motor-energizing circuit.

References Cited in the file of this patent

UNITED STATES PATENTS

| | | |
|---|---|---|
| 2,482,513 | Rossignol et al. | Sept. 30, 1949 |
| 2,784,366 | Steele | Mar. 5, 1957 |
| 2,813,240 | Arnot | Nov. 12, 1957 |